(12) United States Patent
Ito et al.

(10) Patent No.: US 7,531,932 B2
(45) Date of Patent: May 12, 2009

(54) POWER GENERATING SYSTEM

(75) Inventors: Tetsuya Ito, Kawasaki (JP); Kyouichi Okada, Yokohama (JP); Tatsuro Uchida, Chofu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/517,453

(22) Filed: Sep. 8, 2006

(65) Prior Publication Data
US 2007/0057593 A1    Mar. 15, 2007

(30) Foreign Application Priority Data
Sep. 9, 2005    (JP)    ............... 2005-262131

(51) Int. Cl.
*H02K 21/12*    (2006.01)
(52) U.S. Cl. .................. 310/156.34; 310/266
(58) Field of Classification Search ............ 310/156.34, 310/266, 268, 156.28, 156.01
See application file for complete search history.

(56) References Cited
U.S. PATENT DOCUMENTS
3,615,367 A * 10/1971 Tanczyn ................. 420/41
5,074,115 A * 12/1991 Kawamura ................. 60/608
5,216,310 A *  6/1993 Taghezout ................. 310/268
5,493,157 A *  2/1996 Nakamura ................. 310/67 R

FOREIGN PATENT DOCUMENTS
JP    2003-286862    10/2003

\* cited by examiner

*Primary Examiner*—Nguyen N Hanh
(74) *Attorney, Agent, or Firm*—Pillsbury Winthrop Shaw Pittman, LLP

(57) ABSTRACT

A small power generating system includes a turbine driven by a fluid, a small high-speed rotation power generator including a permanent magnet rotor having a permanent magnet and rotated together with the turbine and a plurality of stator coils each of which is comprised of a coreless coil, the rotor being rotated such that voltage is induced on the stator coils, whereby power is generated by the power generator, and a back yoke disposed at one of two opposed sides of the stator coils which is opposed to the other side thereof further confronting the permanent magnet of the rotor, the back yoke being made of a magnetic material with a predetermined electrical resistance.

5 Claims, 4 Drawing Sheets

| | MATERIAL OF BACK YOKE | SPECIFIC RESISTANCE ($\Omega$m) |
|---|---|---|
| COMPARATIVE EXAMPLE 1 | SUS430 | $1 \times 10^{-7}$ |
| COMPARATIVE EXAMPLE 2 | 3%-SILICON IRON | $5 \times 10^{-7}$ |
| EMBODIMENT | FERRITE | 3 |

FIG. 3

POWER GENERATING SYSTEM

CROSS-REFERENCE TO RELATED APPLICATIONS

This application is based upon and claims the benefit of priority from the prior Japanese Patent Application No. 2005-262131, filed on Sep. 9, 2005, the entire contents of which are incorporated herein by reference.

BACKGROUND OF THE INVENTION

1. Field of the Invention

The present invention relates to power generating systems and more particularly to a small power generating system including a turbine and a power generator.

2. Description of the Related Art

JP-A-2003-286862 discloses a micro-turbine power generating system in which with high-speed rotation of turbine by a gas (fluid), a permanent magnet type rotor of a power generator is rotated at high speeds together with the turbine. Rotation of the rotor induces voltage on a stator coil of the power generator so that electrical power is generated.

A stator of the power generator includes an iron core and a stator coil wound on the iron core in the foregoing system. In this arrangement, core loss (particularly, eddy-current loss) in an iron core is increased with increase in a rotational speed of the rotor of the power generator. The core loss is proportional to a square of the frequency. Accordingly, the core loss increases during high-speed rotation of the rotor, thus constituting a factor interrupting high-speed rotation of the rotor. This prevents improvement in power generation efficiency.

SUMMARY OF THE INVENTION

Therefore, an object of the present disclosure is to provide a small power generating system which can reduce core loss in the power generator thereby to improve the power generation efficiency.

The disclosure provides a small power generating system comprising a turbine driven by a fluid, a power generator including a permanent magnet rotor having a permanent magnet and rotated together with the turbine and a plurality of stator coils each of which is comprised of a coreless coil, the rotor being rotated such that voltage is induced on the stator coils, whereby power is generated by the power generator, and a back yoke disposed at one of two opposed sides of the stator coils which is opposed to the other side thereof further confronting the permanent magnet of the rotor, the back yoke being rotated together with the rotor and comprised of ferrite having a specific resistance which is no less than 1 Ωm.

Since the coreless coil is employed as the stator coil of the power generator, the power generating system can reduce the core loss as compared with the conventional equipment. However, the magnetic circuit would not be closed without an iron core. As a result, the density of flux interlinking the stator coils (coreless coil) could not be increased such that the power generation efficiency would be reduced. In view of the problem, the back yoke is disposed at the side of the stator coils which is opposed to another side thereof further confronting the permanent magnet of the rotor. The back yoke is made of the magnetic material with the predetermined electrical resistance. As the result of the arrangement, the magnetic flux is caused to flow though the back yoke thereby to close the magnetic circuit. Consequently, the density of flux interlinking the stator coils can be increased and accordingly, the power generation efficiency can be improved. In this case, since the back yoke is made of the magnetic material with the predetermined electrical resistance, the iron loss can be rendered as small high-speed as possible.

BRIEF DESCRIPTION OF THE DRAWINGS

Other objects, features and advantages of the present invention will become clear upon reviewing the following description of the embodiment with reference to the accompanying drawings, in which:

FIG. 3 illustrates material of back yoke and specific resistance used in an experiment;

DETAILED DESCRIPTION OF THE INVENTION

Figure 1:
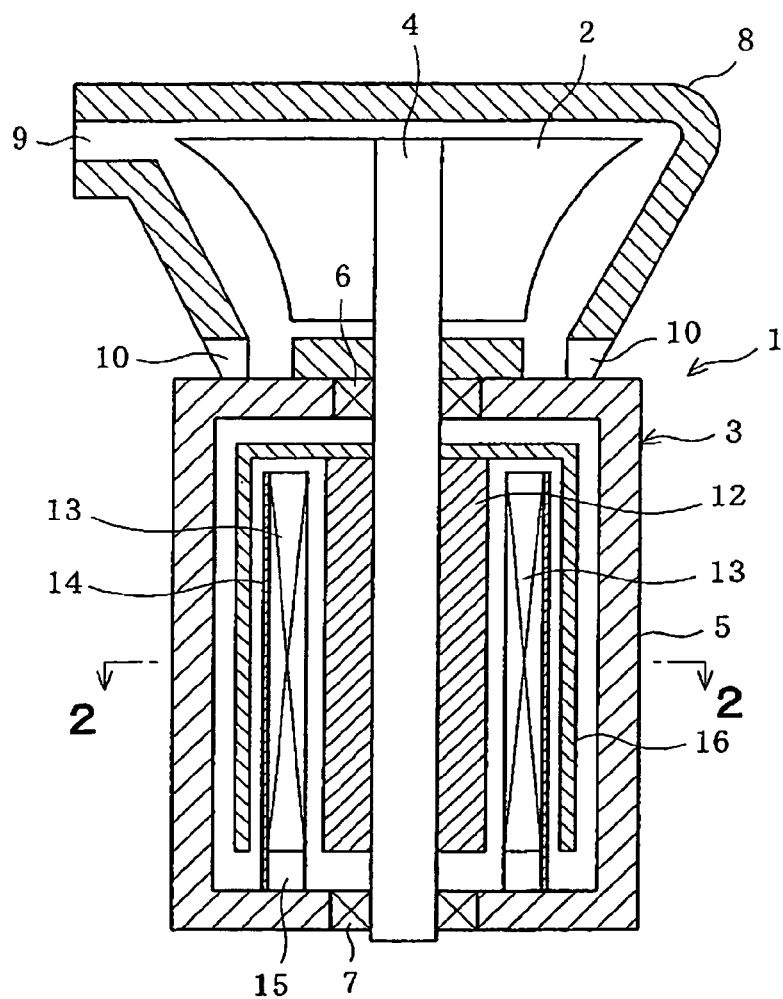
FIG. 1 is a longitudinally sectional side view of a power generating system in accordance with a first embodiment.
Figure 2:
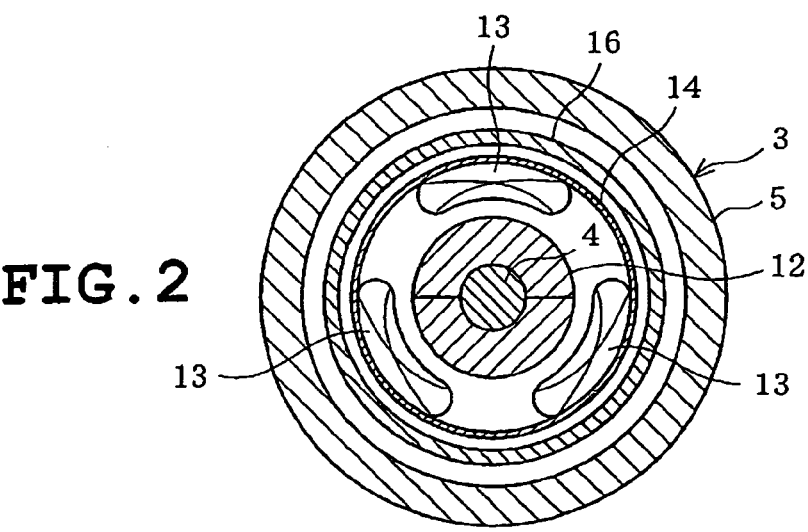
FIG. 2 is a transversely sectional plan view taken along line 2-2 in FIG. 1.

A first embodiment of the present invention will be described with reference to FIGS. 1 to 4. Referring to FIG. 1, a power generating system 1 of the invention includes an upper turbine 2 and a lower power generator 3. The turbine 2 and the power generator 3 are unitized. The turbine 2 is mounted on one end of a rotating shaft 4 so as to be rotatable therewith. The power generator 3 includes a substantially cylindrical outer casing 5 having upper and lower ends on both of which the rotating shaft 4 is rotatably supported via respective bearings 6 and 7. The turbine 2 is covered with a turbine casing 8 formed with an inlet 9 and an outlet 10. The inlet 9 is located at an upper outer periphery of the turbine casing 8 so as to correspond to an outer periphery of the turbine 2. The outlet 10 is located near to the outer casing 5 of the power generator 3.

A cylindrical permanent-magnet rotor 12 is mounted on the rotating shaft 4 so as to be located within the outer casing 5 of the power generator 3. The rotor 12 is comprised of 2-pole permanent magnets and designed to be rotated together with the rotating shaft 4. A plurality of, for example, three, stator coils 13 (see FIG. 2) is annularly disposed in the outer casing 5 so as to be radially spaced from the rotor 12 and so as to surround the rotor 12. Each stator coil 13 comprises a coreless coil and is mounted on a cylindrical printed circuit board 14 disposed at the side of a rear of each stator coil, the side (opposite side) being opposed to the rotor 12. The stator coils 13 are electrically connected to one another by the printed circuit board 14. The stator coils 13 are fixedly mounted on respective mounts 15 of the outer casing 5 together with the printed circuit board 14.

A cylindrical back yoke 16 is disposed at the outer peripheral side of the printed circuit board 14. The back yoke 16 has an open lower end and includes an upper part which is mounted on the rotating shaft 4 so as to be rotated together therewith. The back yoke 16 is made of a magnetic material having a large electrical resistance and disposed at one of two opposite sides of the stator coils which is opposed to the other side (the rear side) thereof further confronting the permanent magnets of the rotor 12. The back yoke 16 is made of ferrite with a specific resistance of 3 Ωm.

When a fluid such as a gas is caused to flow through the inlet 9 into the turbine casing 8 so that the turbine 8 is driven at high speeds by the fluid, the permanent magnet rotor 12 of the power generator 3 is also rotated via the rotating shaft 4 at the high speeds together with the turbine 2. Then, voltage is induced on the stator coils 13 interlinking the magnetic field generated by the rotor 12 and the back yoke 16, whereby power generation is carried out.

In the above case, the coreless coil 13 is employed as the stator coil 13 of the power generator 3. Accordingly, the core loss can be reduced as compared with conventional power generating systems. Furthermore, the back yoke 16 made of the magnetic material having a large electrical resistance is disposed at the rear side of the stator coils 13 (the side opposed to the permanent magnets of the rotor 12). As a result, the magnetic flux flows into the back yoke 16 so that the magnetic circuit is closed. Since this can increase the density of magnetic flux interlinking the stator coils 13, the power generation efficiency can be improved. Furthermore, since the magnetic material with a large electrical resistance is employed for the back yoke 16, the iron loss can be rendered as small as possible. Yet furthermore, since the back yoke 16 is constructed so as to be rotated together with the rotor 12, the loss caused by the back yoke 16 can be reduced. Still furthermore, since an air flow is established in the power generator 3, a temperature increase can be suppressed and accordingly, loss caused in the power generator 3 can be reduced. Consequently, the power generation efficiency can further be improved.

The fluid having flowed into the turbine casing 8 lowers the temperature in a swelling process when passing through the turbine casing 8, thereafter being discharged through the outlet 10. The fluid discharged through the outlet 10 is blown against the outer casing 5 of the power generator 3. Consequently, the power generator 3 can be cooled and accordingly, heat loss can be reduced.

The inventors conducted an experiment in order to confirm variations in the iron loss due to difference of material used for the back yoke 16. A power generating system had a diameter of 8 mm and an axial dimension of 18.5 mm. The power generating system used in the experiment was a coreless three-phase power generator which is the same as the power generator in the first embodiment. A magnetic stainless steel (SUS430) was used for a back yoke in COMPARATIVE EXAMPLE 1. A 3-% silicon iron was used for a back yoke in COMPARATIVE EXAMPLE 2. Ferrite was used for the back yoke in the EMBODIMENT in the same manner as in the foregoing embodiment. FIG. 3 shows specific resistances of the respective foregoing materials.

Figure 4:
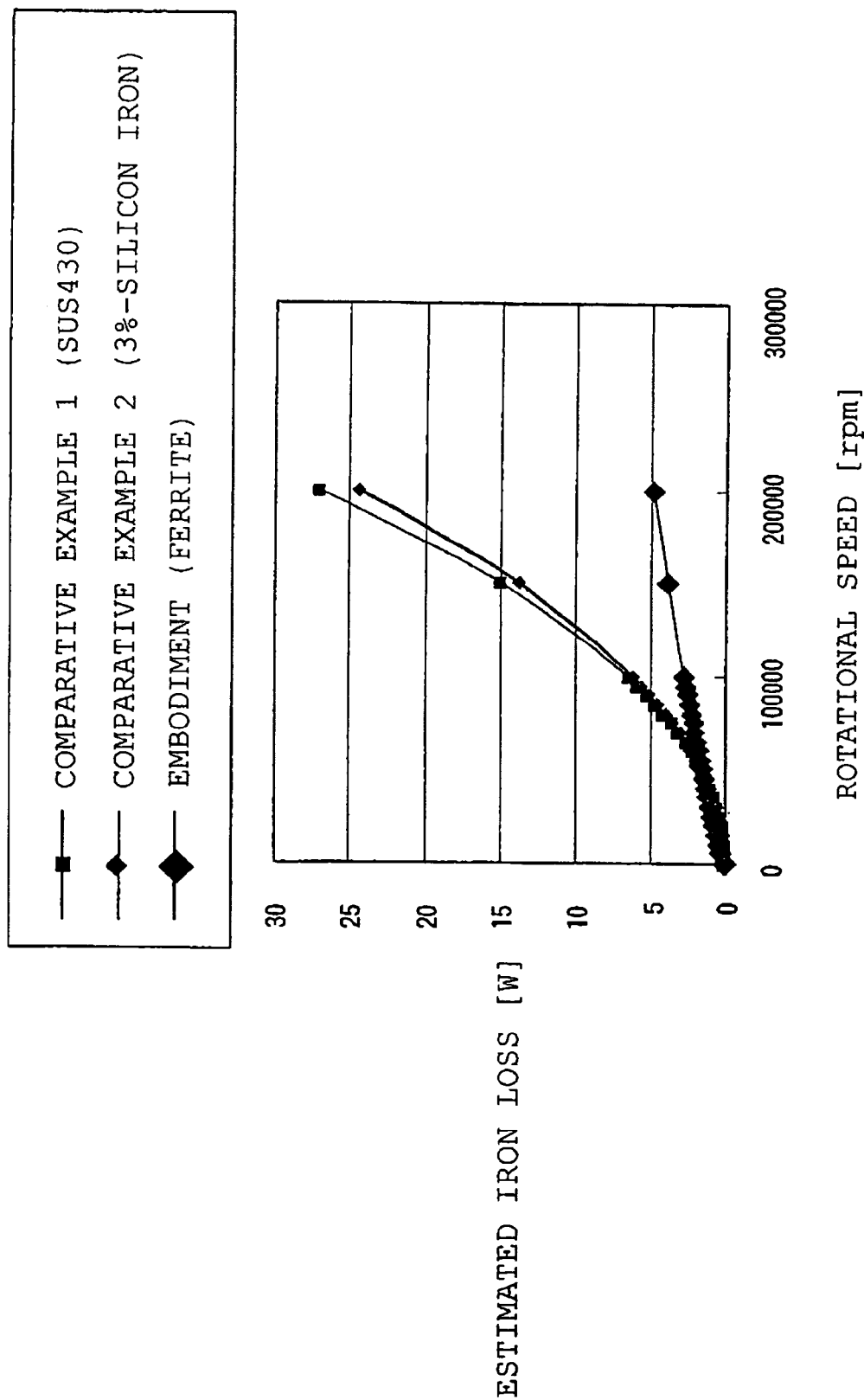
FIG. 4 is a graph showing the characteristics obtained as the results of the experiment.

FIG. 4 shows the experimental results regarding the examples used in the experiment. As obvious from FIG. 5, when ferrite with the specific resistance of 3 $\Omega$m in the EMBODIMENT, it was confirmed that the iron loss was reduced to a larger extent in EMBODIMENT as compared with the COMPARATIVE EXAMPLES 1 and 2. In particular, it can be seen that a larger effect can be achieved as the rotational speed is increased. The back yoke used for the power generator is preferably a magnetic material having a specific resistance of 1 $\Omega$m or above.

Figure 5:
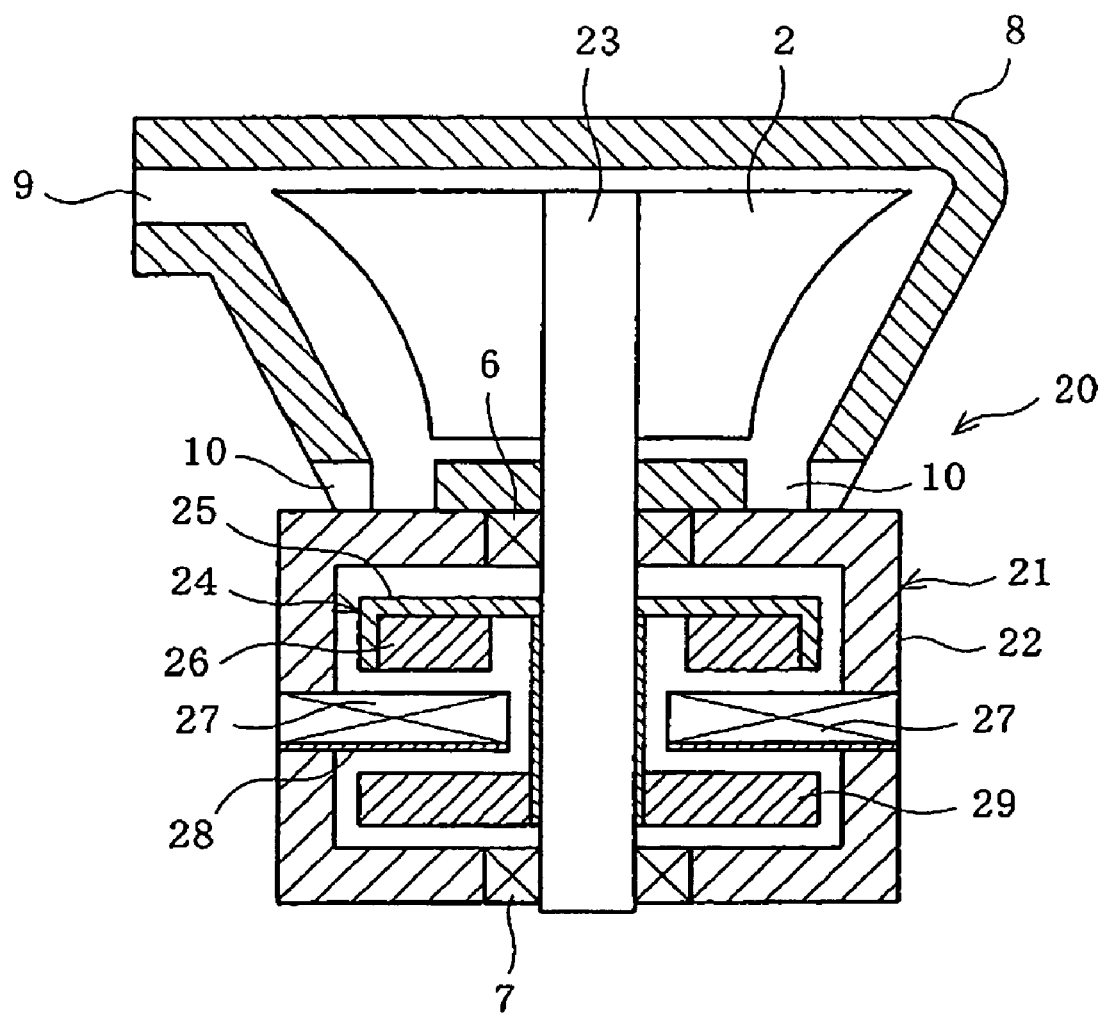
FIG. 5 is a view similar to FIG. 1, showing a second embodiment.

FIG. 5 illustrates a second embodiment of the invention. The difference between the first and second embodiments will be described. In the first embodiment, the power generator 3 is of a radial gap type in which the rotor 12 and the stator coils 13 are disposed so as to be radially spaced from one another. On the other hand, the power generator employed in the second embodiment is of an axial gap type.

More specifically, the power generating system 20 includes a power generator 21 having an outer casing 22 which has a shorter axial dimension than the outer casing 5 in the first embodiment. The rotating shaft 23 rotated together with the turbine 2 has a shorter axial dimension and is rotatably mounted on the bearings 6 and 7 further mounted on the upper and lower ends of the outer casing 22. A permanent magnet rotor 24 includes a rotor yoke 25 having an open underside and formed into the shape of a shallow container and an annular permanent magnet 26 secured to an inner surface of the rotor yoke 25. The rotor 24 is mounted so that the rotor yoke 25 is rotated together with the rotating shaft 23 in the outer casing 23.

A plurality of stator coils 27 are disposed so as to be opposed to and axially spaced from the underside of the permanent magnet 26 in the outer casing 22. Each stator coil 27 comprises a coreless coil and is mounted on an upper side of a printed circuit board 28 disposed at the side of a rear of each stator coil, the side being opposed to the permanent magnet 26. The stator coils 27 are electrically connected to each other or one another by the printed circuit board 28. The stator coils 27 are fixedly mounted on the printed circuit board 28 and the outer casing 22.

An annular back yoke 29 is disposed below the printed circuit board 28. The back yoke 29 is mounted on the rotating shaft 23 so as to be rotated together therewith. The back yoke 16 is made of a magnetic material having a large electrical resistance (the ferrite similar to that in the first embodiment). The back yoke 29 is disposed at one of two opposite sides of the stator coils 27 which is opposed to the other side (the rear side) thereof further confronting the permanent magnets 26 of the rotor 24.

The same effect can be achieved from the second embodiment as from the first embodiment. Particularly in the second embodiment, the axial dimensions of the power generator 21 and the power generating system 30 can be rendered smaller.

The present invention should not be limited to the foregoing embodiments but may be modified or expanded as follows. The back yokes 16 and 29 may fixedly be mounted at the rear side of the stator coils 13 and 27 respectively.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A high-speed rotation power generating system comprising:
    a turbine driven by a fluid;
    a power generator including a permanent magnet rotor having a permanent magnet and rotated together with the turbine and a plurality of stator coils each of which is comprised of a coreless coil, the rotor being rotated such that voltage is induced on the stator coils, in which power is generated by the power generator; and
    a back yoke disposed at one of two opposed sides of the stator coils which is opposed to the other side thereof further confronting the permanent magnet of the rotor, the back yoke being rotated at high-speed of at least 70,000 rpm together with the rotor and comprised of ferrite having a specific resistance which is no less than 1 $\Omega$m.

2. The system according to claim 1, wherein the stator coils are mounted on a printed circuit board with flexibility so as to be connected to each other by the printed circuit board.

3. The system according to claim 1, wherein the high speed is at least 100,000 rpm.

4. The system according to claim 1, wherein an estimated iron loss of the power generator has characteristics of the ferrite depicted in the plot of FIG. 4.

5. The system according to claim 1, wherein the specific resistance of the ferrite is 3 $\Omega$m.

* * * * *